W. A. DÖHNKE.
AUTOMOBILE SIGNAL.
APPLICATION FILED JUNE 20, 1912.

1,050,525.

Patented Jan. 14, 1913.

Witnesses

Inventor
William A. Döhnke,

UNITED STATES PATENT OFFICE.

WILLIAM A. DÖHNKE, OF EVANSTON, ILLINOIS.

AUTOMOBILE-SIGNAL.

1,050,525.  Specification of Letters Patent.  Patented Jan. 14, 1913.

Application filed June 20, 1912. Serial No. 704,756.

*To all whom it may concern:*

Be it known that I, WILLIAM A. DÖHNKE, a subject of the Emperor of Germany, residing at Evanston, in the county of Cook and State of Illinois, have invented a new and useful Improvement in Automobile-Signals, of which the following is a specification.

It has become the practice of chauffeurs to signify the intention of turning a corner or stopping by extending their arms outwardly from the machines, thus, the right arm when the turn is to be toward the right, the left arm when it is to be toward the left, and both arms when the intention is to stop. This practice is useless in the dark.

The primary object of my invention is to provide, for use in the dark on the rear ends of automobiles, as means under the control of the driver, an illuminated device for signaling the aforesaid intentions.

Figure 2:
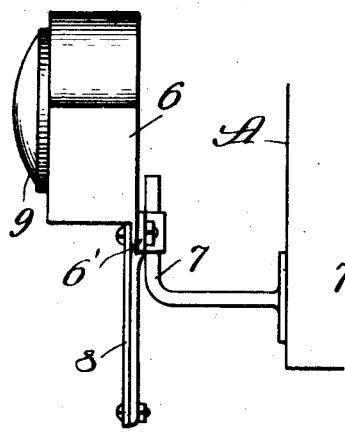
Figure 1:
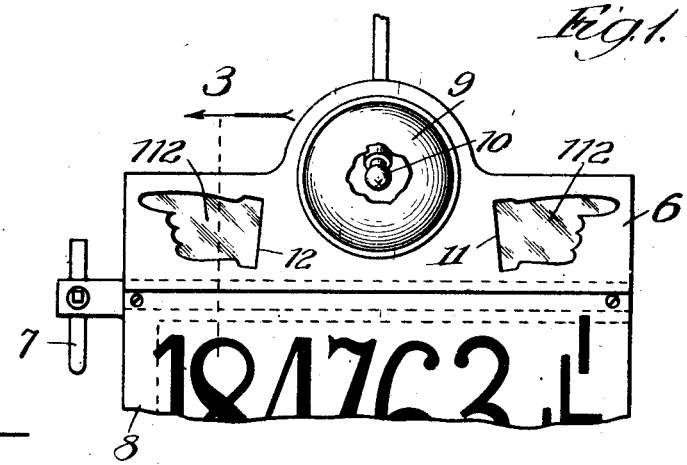
Figure 3:
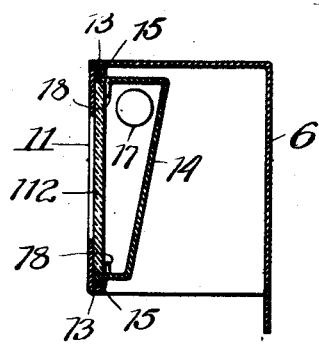
Figure 4:
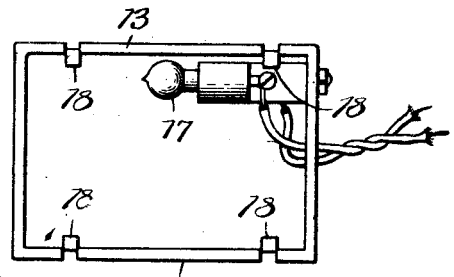

In the accompanying drawings, Figure 1 shows my improved device, in its preferred form of embodiment, by a face view with a portion of the depending number-plate broken away; Fig. 2 shows the device by an end view; Fig. 3 a section through the device on line 3, Fig. 1; Fig. 4 is a face view of one of two similar signal-lamp casings, with its glass cover removed, and Fig. 5 is a diagram showing the electric circuits containing the several lamps and an automobile steering wheel equipped with push-button devices for controlling the lamps for the signaling purposes referred to.

The preferable position for my improved signaling device is adjacent to the lamp commonly used for illuminating the number-plate carried on the rear end of the automobile, since it is there in the most advantageous place for the signal-display and may be housed with such lamp, thereby rendering the whole compact and adapting it to be supported on one bracket. To this end I provide a housing 6, best formed of sheet-metal, on a suitable bracket 6¹ to be supported on an arm 7 projecting from the rear end of an automobile, indicated at A in Fig. 2. The number-plate 8 depends from the back of the open bottom of the housing, being rigidly secured to the lower part of said back. In the front wall of the housing is centrally contained a bull's-eye 9, that used by me being of red-colored glass, behind which is an incandescent electric lamp 10 in the circuit of an electric generator, indicated at B on Fig. 5. Openings 11 and 12 are provided in the front housing-wall at opposite sides of its center containing the bull's-eye, these openings being shown in the form of finger-pointing hands, and each covered with glass 112. The glass is preferably colored, that covering the right-hand opening 11 being red and that covering the left-hand opening 12 being green to correspond with signal-colors used on boats. Behind each opening 11 and 12 is an opaque casing 14 having an open face and provided along its upper and lower edges with outwardly projecting parallel flanges 13 to enter guide-ways 15 provided in the housing to receive them at the upper and lower edges of the openings, thereby with the lamp 10 removed from its socket, to enable the casings 14 to be inserted into place and withdrawn. In one casing is contained an incandescent electric lamp 16 and in the other a similar lamp 17, both in circuit with the generator B and projecting into its casing from the inner end of the latter. Lips 18 are formed on the upper and lower edges of the open faces of the casings and bent inwardly toward each other to form seats for the glass covers, which display the hand-pointing forms of the openings 11 and 12; and with the casings in place in their guide-ways 15, the glass covers bear and are confined against the inner face of the front housing-wall.

For convenience in using the signals for indicating the aforesaid turning and stopping intentions, the lamps 16 and 17 are controlled from the steering-wheel C of the automobile equipped with my improved device, the wheel being provided for the purpose with suitable push-button or switch devices 16¹ and 17¹ at diametrically-opposite points thereon.

Figure 5:
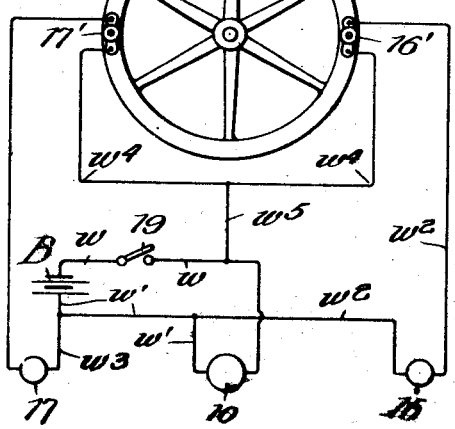

Suitable circuit-connections of the illuminating mediums with the generator B are illustrated in Fig. 5. The continuously-burning lamp 10 has a terminal connected with one pole of the generator by a wire $w$ containing a switch 19, the opposite pole being connected with the other terminal of that lamp by a wire $w^1$. With the wire $w^1$ are connected wires $w^2$ and $w^3$ containing, respectively, the lamps 16 and 17, the wire $w^2$ leading from one terminal of the push-button 16¹ and the wire $w^3$ from the corresponding terminal of the push-button 17¹;

and the other push-button terminals are connected through the branch $w^5$ of a wire $w^4$ with the wire $w$. With the switch 19 closed, therefore, for illuminating the number-plate 8 by the lamp 10, a chauffeur handling the steering-wheel C may readily, with either hand, actuate a push-button to light a lamp 16 or 17 for signaling the intention to turn the automobile about a corner toward the right or left-hand, indicated by one or the other of the pointing glass hands 112, or both push-buttons at once to indicate the intention to stop the machine.

What I claim as new and desire to secure by Letters Patent is—

1. In a signaling-device of the character described, comprising, in combination, a housing provided with a front-wall opening at each side of its center, removable casings formed with opaque ends, backs, bottoms and tops, and with open faces, said casings being located in the housing and covering the openings therein, and electric lamps in said casings.

2. A signaling-device of the character described, comprising, in combination, a housing provided with a front-wall glass covered opening at each side of its center, casing-guides in the housing, opaque casings each provided with an open face removably-insertible into the guides in the housing and provided with seats for the glass-coverings, and electric lamps in said casings.

WILLIAM A. DÖHNKE.

In presence of—
L. HEISLAR,
R. SCHAEFER.